United States Patent Office 3,598,597
Patented Aug. 10, 1971

3,598,597
SPEED AND CONTRAST OF A SILVER HALIDE PHOTOGRAPHIC EMULSION OBTAINED BY ADDITION OF SILVER CHLORIDE EMULSION TO SILVER BROMIDE EMULSION
Francis J. Farren and Francis J. Avery, Vestal, N.Y., assignors to GAF Corporation, New York, N.Y.
No Drawing. Filed May 24, 1967, Ser. No. 640,807
Int. Cl. G03c 1/28
U.S. Cl. 96—108         7 Claims

ABSTRACT OF THE DISCLOSURE

The subject invention relates to photographic silver halide emulsions formed by the incorporation of a fine grain silver chloride emulsion in an ammoniacal silver bromo-iodide emulsion.

---

This invention relates to the manufacture of a photographic film or paper having improved sensitometric characteristics including speed and gradation. It has been found that by incorporating a fine grain silver chloride emulsion in an ammoniacal silver bromo-iodide emulsion in the range of about 0.5%–15% by weight, an improvement in contrast and speed is gained. The added silver chloride emulsion will generally comprise about 1.0 to 10% AgCl.

Emulsions sensitive to light and other actinic radiation are conventionally prepared for photographic application by first soaking a part of the gelatin required for the emulsion formula in water, completing its solution and then adding soluble halide salt, usually with addition of ammonia. Such halide salts frequently are either the straight bromides or iodides, usually in the alkali metal form or they are the bromo-iodide mixtures. Generally, mixtures of about 96 to 99 mole percent bromide and about 1 to 4 mole percent of iodide are used. A ratio of about 97 mole percent of bromide and about 3 mole percent of iodide is preferred.

To the resulting solution, silver nitrate is added in the desired concentration with the rate of addition, temperature, and other conditions, being dependent on the particular emulsion product to be obtained. Generally the silver is precipitated as the halide in this step. The partial emulsion so prepared is then heated to carry out a first ripening step. Additional gelatin is later added and finally, after the mixture has been set to a gel by chilling, it is broken up and washed to remove the excess water soluble salts. Breaking up to a condition finely divided enough for effective washing may be accomplished by a number of techniques, for example, by extrusion through a die to give slender noodles of emulsion, by a coagulation wash technique employing organic "wetting agent"-type materials in which the emulsion is loosely coagulated and separated for washing, or by a precipitation technique generally using inorganic salts, such as ammonium sulfate, in which the gelatin silver halide emulsion is precipitated as relatively large particles suitable for rapid and efficient washing. In both these latter techniques relatively dilute gelatin solutions are employed.

After washing, the emulsion generally is reconstituted by agitation and the addition of further gelatin and water. The reconstituted emulsion is allowed to digest for a period of time and then other "ripening" agents for pH adjustment, sensitization, stabilization, etc., are added and the mixture allowed to stand for a period of time. Following this "after-ripening," coating finals, such as stabilizers, sensitizing dyes or surfactants may be added before application of the emulsion to photographic sheet material.

In this invention a separate silver chloride, silver citrate, silver tartrate or silver oxalate emulsion is prepared and is added in the proper proportions along with the coating "finals" to the silver bromide and/or bromo-iodide silver emulsion. The preparation of the silver chloride or disilver carboxylate may follow the same lines of preparation as the main silver emulsion. When the silver bromo-iodide emulsion is to be overcoated with an additional surface layer, for example, a hardened gel coating for increased abrasion resistance, it is preferable to employ at least about 3% by weight of the silver chloride emulsion.

This invention may be practiced also with the so-called test print-out emulsions which are of the ammoniacal silver bromo-iodide type. In this case the incorporation of a fine grain silver chloride emulsion added on the basis of 0.5–15% of the basic emulsion results in an increase in net density.

The following are examples of the preparation of fine-grain silver chloride emulsions which can be used as finals additives in this invention.

EXAMPLE A

An emulsion was prepared by mixing 87.5 grams gelatin, 16.5 grams sodium chloride and 590 cc. of water. To this emulsion a solution of 40 grams silver nitrate in 240 cc. of water was added over a period of one minute at 50° C. The mixture was allowed to digest for 10 minutes at 50° C. and then it was chilled, noodled and washed to an electrical conductivity of 10,000 mhos.

EXAMPLE B 6,000 grams of gelatin were dissolved in 73,500 cc. of water at 117° F. A solution of 309 g. citric acid, 30 g. potassium bromide, 1725 g. sodium chloride and 18 cc. of 10% aqueous potassium iodide in 9,000 cc. of water was dumped into the first mixture and then 150 cc. of a 2% solution of hydroxy-5-methyl-triazoindolizine mixed with 750 cc. of alcohol was slowly added. This mixture was stirred for five minutes. Then a solution of 3375 grams of silver nitrate in 33,750 cc. water was percolated into this mixture during a period of five minutes.

Thirty minutes after the start of percolation, a solution of 6,750 g. of gelatin in 22,500 cc. of water at 117° F. was added to the percolated mixture and the resulting mixture was allowed to digest for about 30 minutes at 117° F. After this digestion period, the mixture was allowed to cool to 100° F. and 150 cc. of a 10% potassium dichromate aqueous solution was added. The mixture was cooled to 80° F., filtered and chilled. The emulsion was then after-ripened, raised to a temperature of 115° F. in 30 minutes and held at this temperature for 40 minutes, after which time it was cooled to 100° F., and again raised to 115° F. for 15 minutes digestion at this higher temperature.

Then, 5 grams of gel per kilogram of ripened emulsion are added and held for five minutes. The mixture is cooled to 80° F., filtered and stored in crocks at 40° F. After several days, the emulsion is noodled and washed to an electrical conductivity of 10,000 mhos. 10 cc. of phenol per kilogram of emulsion is then added as a preservative.

The following examples of photographic compositions made according to this invention are to be considered illustrative only and not limiting.

In these examples, a standard ammoniacal silver bromo-iodide gelatin emulsion was employed for a series of comparative tests.

Example I

To each batch of emulsion the following mixture was added as finals along with a percentage of silver chloride emulsions, based on the total emulsion from Examples A or B above, as specific in the table below. The following amounts were added for each 500 grams of emulsion:

2% of 7-hydroxy-5-methyl-triazaindolizine—0.5 cc.
formaldehyde (20% aqueous)—1.0 cc.
potassium chrome alum (10% aqueous)—4.0 cc.
silica gel—4.0 g.
saponin (20%)—6.0 cc.

Example II

Additional samples were surface coated with a mixture of gelatin—20 grams
chrome alum (10% aqueous)—6 cc.
thymol (10% aqueous)—4 cc.
saponin (20%)—6.0 cc.

The materials were exposed in a sensitometer and processed for 1 minute in a paper developer described in Henry M. Lester's Photo Lab Index Section 1, page 59 (1944) as Ansco A–125 developer and as having the following formula:

Metol (p-methylaminophenol sulfate)—3.0 g.
sodium sulfite—44.0 g.
hydroquinone—12.0 g.
sodium carbonate—65.0 g.
potassium bromide—2.0 g.
water to make 2.0 liters After fixing and washing, readings for speed at density 0.6, LES (log exposure scale), Bar gamma, G max. (maximum gradient), D max. (maximum density) and Fog shown in the table below were obtained. The compositions and the results obtained are:

TABLE

| Example | Quantity of emulsion added | Speed | LES | Bar gamma | G max. | D max. | Fog | Gm. Ag/m. |
|---|---|---|---|---|---|---|---|---|
| I | Control | 1,514 | 1.36 | 1.23 | 1.80 | 1.37 | .03 | 3.0 |
| II | Emulsion B 1% | 2,399 | 1.18 | 1.40 | 1.95 | 1.37 | .03 | 2.2 |
| III | 2% | 2,951 | 1.17 | 1.43 | 2.05 | 1.38 | .01 | 2.8 |
| IV | 3% | 3,162 | 1.30 | 1.40 | 1.85 | 1.39 | .02 | 2.7 |
| V | 5% | 3,090 | 1.22 | 1.33 | 1.75 | 1.38 | .02 | 2.8 |
| VI | 10% | 3,236 | 1.19 | 1.37 | 1.45 | 1.39 | .04 | 2.8 |
| VII | Control | 1,445 | 1.39 | 1.18 | 1.55 | 1.35 | .03 | 2.3 |
| VIII | Emulsion A 3% | 2,692 | 1.23 | 1.32 | 1.73 | 1.35 | .03 | 2.0 |

As can be seen from this data, the photographic emulsion to which the finely divided silver chloride was added had improved results in important aspects of film speed and density. This invention is of value in preparing high speed negative emulsions, for X-ray, color and microfilm as well as black and white photographic film. It is useful with neutral, boiled and acid-type emulsion formulations as well as ammoniacal bromo-iodo types.

This invention has been described with respect to certain preferred embodiments and there will become obvious to persons skilled in the art other variations, modifications, and equivalents which are to be understood as coming within the scope of the present invention.

What is claimed is:

1. In a method of preparing a light-sensitive ammoniacal silver bromo-iodide photographic emulsion wherein final additives are added to the emulsion after ripening, the improvement which comprises adding with such final additives about 0.5 to 15% by weight of the silver bromo-iodide emulsion of another emulsion containing about 1.0 to 10% of finely divided silver chloride or a mixture of silver chloride and silver citrate.

2. The method of claim 1 in which about 3 to 15% of said other emulsion containing about 1.0 to 10% of a silver salt is added to the said silver bromo-iodide emulsion and, after coating of the thus prepared bromo-iodide emulsion on a photographic support, a gelatin surface containing hardening agent is coated over the emulsion layer.

3. A light-sensitive silver bromo-iodide emulsion as defined in claim 7 wherein said other emulsion contains finely divided silver chloride.

4. A light-sensitive silver bromo-iodide emulsion as defined in claim 7 wherein said other emulsion contains a mixture of silver chloride and silver citrate.

5. A method as defined in claim 1 wherein said other emulsion contains finely divided silver chloride.

6. A method as defined in claim 1 wherein said other emulsion contains a mixture of silver chloride and silver citrate.

7. A light-sensitive ammoniacal silver bromo-iodide photographic emulsion prepared in accordance with the method of claim 1.

References Cited

UNITED STATES PATENTS

| 2,331,103 | 2/1943 | Weyerts | 96—107 |
| 3,206,313 | 9/1965 | Porter et al. | 96—107X |
| 3,409,436 | 11/1968 | Farren et al. | 96—107X |

NORMAN G. TORCHIN, Primary Examiner

R. E. FICHTER, Assistant Examiner

U.S. Cl. X.R.

96—107